United States Patent [19]

Davis et al.

[11] 4,272,399

[45] Jun. 9, 1981

[54] CONVERSION OF CARBON-CONTAINING MATERIALS TO SYNTHESIS GAS

[75] Inventors: George D. Davis, Creve Coeur, Mo.; James C. Hill, Seabrook, Tex.; Talmage D. McMinn, Des Peres; Charles W. Rooks, St. Louis, both of Mo.

[73] Assignee: Monsanto Company, St. Louis, Mo.

[21] Appl. No.: 77,706

[22] Filed: Sep. 21, 1979

[51] Int. Cl.$^3$ .......................... C01B 2/06; C01B 2/10
[52] U.S. Cl. ................................ 252/373; 48/197 R; 48/214 A
[58] Field of Search ......... 252/373; 48/197 R, 214 R, 48/214 A

[56] References Cited

U.S. PATENT DOCUMENTS 2,602,809  7/1952  Dickinson ...................... 260/449 R Primary Examiner—Howard T. Mars
Attorney, Agent, or Firm—Paul L. Passley; James C. Logomasini; Stanley M. Tarter

[57] ABSTRACT

Carbon-containing materials are gasified to produce synthesis gas, a mixture of hydrogen and carbon monoxide, in a three zone unified system (oxidizer, reducer and gasifier) using a metal oxide as the oxygen and heat source for the gasification with steam and carbon dioxide. Synthesis gas contacts the metal oxide prior to the gasification to release the oxygen and convert the synthesis gas to steam and carbon dioxide as the gasification medium.

21 Claims, 1 Drawing Figure

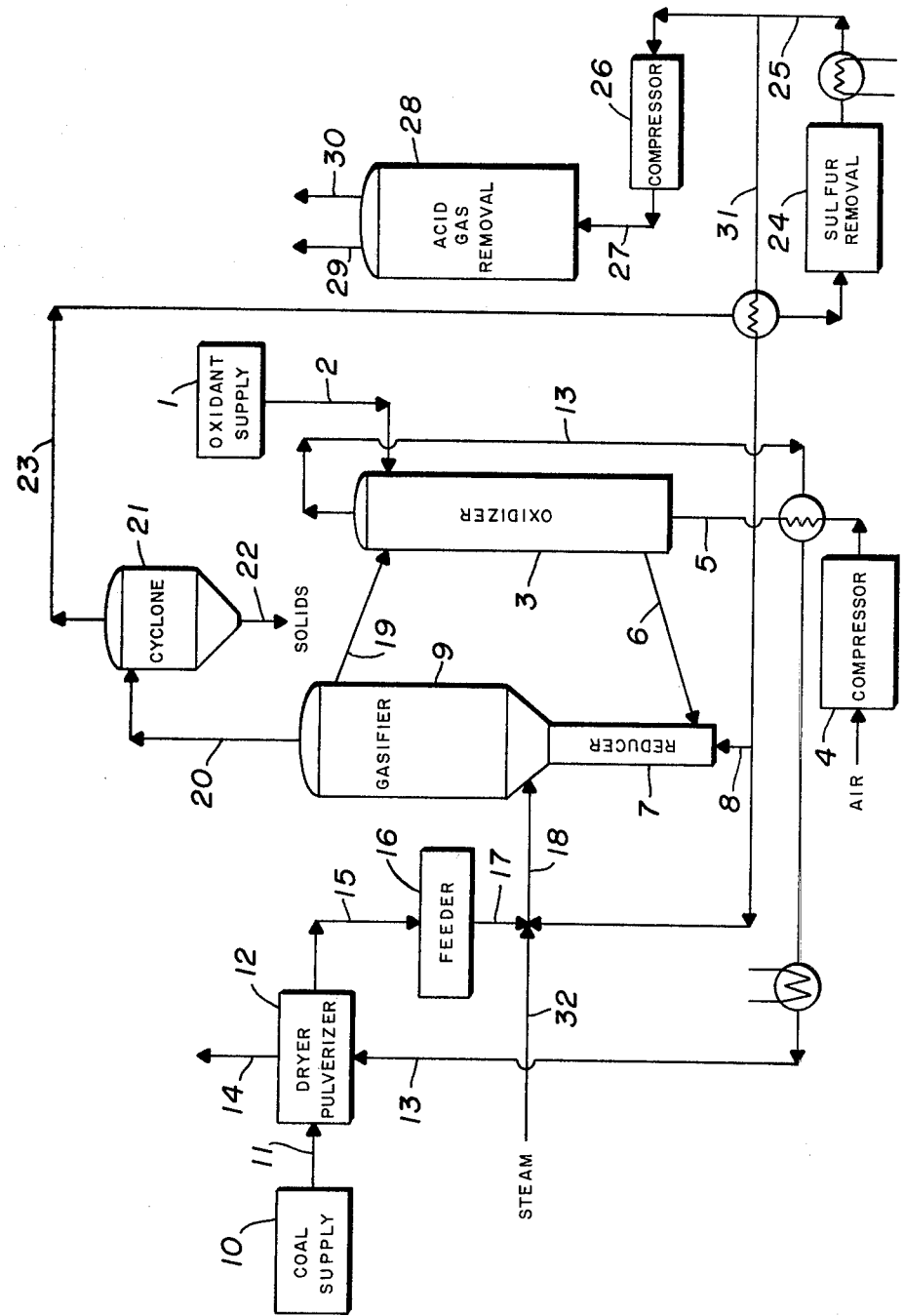

CONVERSION OF CARBON-CONTAINING MATERIALS TO SYNTHESIS GAS

BACKGROUND OF THE INVENTION

This invention relates to the treatment of carbon-containing materials. In one aspect this invention relates to the treatment of carbon-containing materials, such as coal, coke and hydrocarbons to produce oxides of carbon therefrom. In still another aspect this invention relates to a process for the production of high purity synthesis gas, a mixture of hydrogen and carbon monoxide, from carbon-containing materials.

Coal and coke may be treated with oxygen and/or steam at relatively high temperatures to convert the coal or coke to hydrogen and carbon monoxide, which products are useful for various purposes including the synthesis of organic compounds therefrom. When steam is used alone to gasify coal or coke it is necessary to supply heat from an external source. The heat released by gasifying coal with relatively pure oxygen tends to be excessive. As the result, steam and oxygen are normally used together in such proportions that the net reaction heat is sufficient to maintain the desired temperatures for the gasification of the coal or coke. In using the combination of steam and oxygen in the above manner the oxygen may be used in a substantially pure form and by such method the process is continuous, thermally efficient, and produces a gas comprising hydrogen and carbon monoxide.

The use of oxygen is an economic burden and increases process complexity. If the oxygen is to be supplied to the process as air rather than as purified oxygen, the economic advantage obtained by using air is obviated by the fact that product gas contains large amounts of diluent nitrogen. It is desirable, therefore, to provide a process which eliminates purification of the oxygen but produces a gas substantially free from nitrogen.

U.S. Pat. No. 2,602,809 discloses the gasification of solid carbon-containing materials using metal oxides, such as $Fe_3O_4$ or $Fe_2O_3$, which serve as the principal source of oxygen for the reaction. The process disclosed employs a counter-current flow of coal and metal oxide in a fluidized state in a reactor for effecting reduction of the metal oxide to release oxygen and effecting oxidation of the coal with the released oxygen to form carbon oxides. The reduced metal oxide is reoxidized for reuse with air whereby it is heated by the heat from the exothermic air oxidation reaction. If a synthesis gas product is desired, a portion of the reduced metal oxide is reoxidized with steam at an elevated temperature to produce hydrogen. This hydrogen is then mixed with the carbon monoxide obtained from the coal gasification to produce the synthesis gas.

SUMMARY

This invention provides a unified process for producing high purity synthesis gas from carbon-containing materials. In this process a metal-oxygen containing material is used as the transfer agent of oxygen and heat for oxidatively gasifying carbon-containing material. The metal-oxygen containing material can be characterized as a heat and oxygen carrier and is herein referred to generally as an oxidant. In a major aspect of this invention steam, carbon dioxide, synthesis gas or mixtures thereof is employed to fluidize and transport the oxidant through an upflow, cocurrent system. Synthesis gas is first oxidized and heated by the oxidant to form water and carbon dioxide in an oxidant reducing zone prior to contact of the oxidant and gases with the carbon-containing material in a gasifying zone. The carbon-containing materials are oxidized to predominantly carbon monoxide and hydrogen in a manner such that the nitrogen contained in the air does not contaminate the product synthesis gas. The gasification of the carbon-containing materials is accomplished by the alternate oxidation and reduction of a fluidized oxidant. After the gasification, the reduced oxidant which may be in the form of the elemental metal or lower oxidized state is reoxidized in an oxidizing zone and the cycle repeated. As used herein, reduced oxidant refers to either elemental metal or a lower oxidation state resulting from the reduction of the oxidant.

Typical objects of this invention are (1) to provide a process for gasifying carbon-containing materials, (2) to provide a process for converting carbon-containing materials to carbon oxides, (3) to provide a process for the production of a synthesis gas comprising hydrogen and carbon monoxide in a desired ratio and (1) to provide an improved process for the gasification of carbon-containing materials wherein heated oxidant is at least partially reduced by synthesis gas with the formation of steam and carbon dioxide prior to contact with the carbon-containing material and gasification thereof.

Various other objects, aspects and advantages of this invention will become apparent to those skilled in the art from the accompanying description, drawings and appended claims.

According to this invention, a three zone system is employed wherein an oxidant such as iron chromite ore, at an elevated temperature, is fluidized and at least partially reduced by synthesis gas in a reducing zone, with the formation of steam and carbon dioxide. The partially reduced oxidant and associated gases move under fluidized conditions to a gasifying zone where contact with carbon-containing material is made under conditions whereby the carbon-containing material is oxidized to carbon oxides, mainly to carbon monoxide. The gaseous effluent from the gasifying zone is removed for purification and the reduced oxidant is transferred to an oxidizing zone where it is contacted with air under conditions to reoxidize and heat the oxidant. A portion of the heat liberated by the air oxidation is stored as sensible heat in the oxidant which provides heat for the reducing and gasifying zones. The heated reoxidized oxidant is returned to the reducing zone.

In the preferred method of operation of the various zones, particulate oxidant is maintained fluidized and continuously circulated through the reaction system. Throughout the gasifying zone linear gas velocities are maintained such that the solid materials are entrained in the gases. Gas velocities above about ten (10) feet per second are employed for such operation. Actual gas velocities employed will be dependent upon the size, shape and densities of the solid materials employed. In this type of operation, means will be provided internally or externally of the gasifying zone for separating solid materials entrained in the gaseous effluent.

The oxidant usable in the present invention will generally be a particulate material of a size capable of fluidization comprising a metal oxide which is reducible and reoxidizable under the conditions of operation of the system. Various metal oxides and metal oxide-containing materials may be used as the oxidant for providing oxygen to the reducing and gasifying zones. Suitable oxidant materials contain oxides of iron, cobalt, nickel, molybdenum, manganese, barium, vanadium, chromium, copper, cerium, uranium and mixtures thereof. Natural occurring ores, such as iron chromite ore, containing iron oxide may be used as an oxidant. Oxidants applicable to this invention are more fully described in copending application Ser. No. 077,692 filed Sept. 21, 1979, the disclosure of which is incorporated herein by reference.

The temperature employed in the reduction and gasification can vary over a wide range. Preferably, such reaction will be conducted from 800° C. to 1200° C. Pressure on the system can also vary. The system can be operated under pressures from 5 psig to 2000 psig.

As previously indicated, the process of this invention utilizes an upflow fluidized system with the oxidant and carbon-containing material flowing cocurrent. The fluidization and transportation of the materials are obtained by introducing a carrier gas into the system. The carrier gas can be inert to the various reactions, but preferably is steam, carbon dioxide, synthesis gas or mixtures thereof which enters into the reaction and thus eliminates excess gas handling. The carrier gas is introduced at such rates to fluidize and transport the materials and to maintain turbulent flow of the materials in the system. Introduction of the gases at velocities of 10 to 30 ft./sec. will generally be sufficient. However, this variable is dictated by the size, shape and density of the materials moving through the system.

This invention will be more specifically described with reference to the drawings. The FIGURE is a diagrammatic illustration of the apparatus in the system described with regard to gasifying coal.

According to the FIGURE fresh oxidant, as needed, from supply 1 is introduced through conduit 2 to oxidizing zone 3. Air is compressed on compressor 4 and introduced through conduit 5 into the bottom of oxidizer zone 3. Oxidizing zone 3 is maintained under conditions whereby the oxidant is oxidized by oxygen from the air through an exothermic section. The exothermic reaction heats the oxidant. The oxidant is transported from oxidizing zone 3 through conduit 6 into the lower portion of reducing zone 7. Synthesis gas is introduced through conduit 8 into the bottom of reducing zone 7 at such a rate to fluidize and move the oxidant upwardly through the reducing zone 7 into gasifying zone 9. In reducing zone 7 contact of the synthesis gas with the heated oxidant causes reduction of the oxidant and formation of water and carbon dioxide from the synthesis gas. Coal from supply 10 is introduced through conduit 11 to dryer-pulverizer 12 where it is ground to a particle size in the range of 40 to 200 microns and dried to less than 2 percent moisture by contact with the effluent from oxidizing zone 3 introduced through conduit 13. Gases from dryer-pulverizer 12 are removed through conduit 14. The dried/pulverized coal is fed through conduit 15 into feeder 16. Coal is metered from feeder 16 through conduit 17 and conduit 18 into gasifying zone 9. Additional synthesis gas and steam are introduced through conduits 31 and 32 to move the coal into gasifying zone 9. In gasifying zone 9, the coal is oxidized to predominately carbon monoxide and hydrogen through contact and turbulent mixing with the upflowing mixture of heated oxidant and gases from reducing zone 7. The reaction gases and oxidant are separated. Such separation can be accomplished by a cyclone separator positioned in the upper portion of gasifying zone 9. Reduced oxidant is removed from the upper portion of gasifying zone 9 through conduit 19 and introduced into reducing zone 3 for reoxidation and reheating. Gaseous effluent is removed from gasifying zone 9 through conduit 20 and introduced to cyclone 21. Alternatively, the reaction gases and oxidant can be removed together from gasifying zone 9 through conduit 20 and separated in a first cyclone, not shown. In this case, conduit 19 would connect with the first cyclone and reducing zone 3 to convey the oxidant and the gaseous effluent would be fed to cyclone 21. In cyclone 21 entrained solids such as ash and fines are separated and removed through conduit 22 for disposal. The gaseous effluent is then fed through conduit 23 into sulfur removal zone 24. Desulfurized gaseous effluent is fed through conduit 25 into gas compressor 26. The desulfurized effluent is fed through conduit 27 to an acid gas removal zone 28 where carbon dioxide is removed through conduit 29 and substantially pure synthesis gas is removed through conduit 30. A portion of the gaseous effluent from sulfur removal zone 24 is fed through conduits 31 and 8 to the reducing zone 7 and through conduits 31 and 18 to transport coal to the gasifying zone 9. As shown in the drawing, heat exchange of the various gas streams may take place. Also, not shown, the solid oxidant and coal may be stripped with a gas such as carbon dioxide between the various zones to remove gases such as nitrogen.

When steam, carbon dioxide or mixtures thereof is to be used, it can be introduced through conduit 32 into conduit 18 in place of or in addition with synthesis gas from conduit 31. If steam, carbon dioxide or mixtures thereof is to be used as the sole gas for fluidizing the oxidant, it will be introduced to reducing zone 7 through conduit 8 in place of synthesis gas from conduit 31. Various steps and auxiliary operations, such as the dryer-pulverizer 12, feeder 16, compressors 4 and 26, cyclone 21, sulfur removal 24 and acid gas removal 28 are well known standard operations and need not be further described here.

The particle size of the carbon-containing material, if a solid, and oxidant employed in the process of this invention may vary over a wide range. However, the solids will generally be employed in a particle size ranging from 40 to 200 microns.

Any carbon-containing material may be gasified in accordance with this invention. It is particularly useful for gasifying solid carbon-containing materials such as coal, including a broad range of coal from lignites to anthracites, chars, peat, coke, coke breeze, wood chips, kelp and the like. Also, liquid and gaseous hydrocarbons, for example, crude oils whole or fractions such as asphalts and vacuum residuals, shale oil, refined oils such as fuel, cycle, Bunker C and tars, chemical plant streams such as aromatic oils and heavy tars, and tars from the tar sands can be employed as the carbon-containing material as feed for this invention.

EXAMPLES

The practice of this invention will now be more fully illustrated in the following Examples.

In the following Examples, the reactor employed for carrying out the particular coal gasification runs comprises a 24-inch long stainless steel schedule 40 pipe with a 2.05-inch inside diameter main section fitted at the bottom with a 40 degree included angle conical section and at the top with an expanded section with a 2.5-inch inside diameter and 9½ inches long, including conical joining section, capped with a flange. Fluidizing gas is introduced through the bottom of the conical section of the reactor and coal is introduced at a midway point of the conical section. Gasifying agents are introduced through a sparger extending from the top of the reactor downward through the fluidized bed and into the conical section. Product gases are removed through the top of the reactor for analysis. The reactor is enclosed in an insulated electric resistance heater.

EXAMPLE 1

This example illustrates the gasification of various coals using steam as the gasifying agent and iron chromite ore from the Transvaal mines of South Africa as the oxidant.

In each run, the reactor contains 1200 grams (75 to 350 microns) of oxidant fluidized with nitrogen. The oxidant is maintained at a temperature of 1050° C. and a pressure of 5.0 psig. Coal entrained in 3.0 L/min of nitrogen is fed to the reactor along with approximately 3.6 gm/min of water as steam as the gasifying agent. Each run is continued for about 30 minutes with reaction gases periodically sampled and analyzed. The gas velocity at the coal entry is approximately 0.7 ft/sec and at the reaction gas outlet is approximately 1.2 ft/sec. The results for each particular coal tested are given in the following Table 1 where Production is the cubic feet of gas produced per pound of coal converted, Selectivity is the mole percent of the carbon converted to CO and Productivity is the pounds of carbon converted per hour per cubic foot of oxidant bed.

TABLE 1

| RUN | COAL | COAL FEED RATE (gm/min) |
|---|---|---|
| A | Wyoming Sub-bituminous | 3.4 |
| B | Texas Lignite | 3.9 |
| C | Illinois #6 Bituminous | 3.7 |
| D | Indiana Bituminous | 3.4 |

| RUN | TIME (min) | PRODUCTION ft$^3$/lb | H$_2$/CO MOLE RATIO | SELECTIVITY MOLE % | PRODUCTIVITY lb/hr/ft$^3$ |
|---|---|---|---|---|---|
| A | 4 | 28.3 | 0.4 | 64.8 | 13.1 |
|   | 6 | 39.3 | 1.1 | 73.1 | 13.7 |
|   | 8 | 52.9 | 2.0 | 71.9 | 12.8 |
|   | 10 | 44.9 | 1.4 | 77.7 | 13.0 |
|   | 15 | 48.6 | 1.5 | 81.9 | 12.4 |
|   | 20 | 51.0 | 1.5 | 86.0 | 11.8 |
|   | 25 | 48.9 | 1.5 | 82.6 | 12.6 |
|   | 30 | 49.4 | 1.6 | 81.1 | 12.5 |
| B | 4 | 26.9 | 0.8 | 63.8 | 14.5 |
|   | 6 | 34.9 | 1.2 | 80.0 | 13.3 |
|   | 8 | 35.7 | 1.2 | 81.1 | 14.5 |
|   | 10 | 35.9 | 1.2 | 82.5 | 14.6 |
|   | 15 | 36.8 | 1.3 | 83.8 | 14.4 |
|   | 20 | 37.1 | 1.3 | 83.8 | 14.1 |
|   | 25 | 37.0 | 1.3 | 83.8 | 14.1 |
|   | 30 | 37.2 | 1.3 | 84.4 | 14.0 |
| C | 4 | 21.4 | 0.6 | 16.8 | 9.6 |
|   | 6 | 30.8 | 1.0 | 61.3 | 10.0 |
|   | 8 | 39.5 | 1.5 | 71.6 | 9.8 |
|   | 10 | 44.3 | 1.6 | 75.0 | 9.4 |
|   | 15 | 46.5 | 1.6 | 76.9 | 9.1 |
|   | 20 | 43.9 | 1.6 | 78.5 | 10.2 |
|   | 25 | 43.4 | 1.6 | 79.2 | 10.5 |
|   | 30 | 43.8 | 1.6 | 81.3 | 10.0 |
| D | 8 | — | 1.8 | 75.5 | 9.9 |
|   | 10 | — | 1.8 | 76.4 | 9.9 |
|   | 15 | — | 1.9 | 76.7 | 10.3 |
|   | 20 | — | 1.8 | 79.0 | 10.6 |
|   | 25 | — | 1.8 | 79.5 | 11.0 |
|   | 30 | — | 1.8 | 78.5 | 11.0 |

EXAMPLE 2

This Example illustrates the gasification of coal in the presence of an inert heat carrier and thus the improvement of using an oxidant when the results of this Example are compared with those of Run A of Example 1.

Example 1, Run A is followed except the reactor contains 1,000 grams of alpha alumina oxide instead of an oxidant. The Wyoming sub-bituminous coal at 3.5 gm/min and 3.7 gm/min of water as steam are fed.

| TIME (min) | PRODUCTION ft$^3$/lb | H$_2$/CO MOLE RATIO | SELECTIVITY MOLE % | PRODUCTIVITY lb/hr/ft$^3$ |
|---|---|---|---|---|
| 4 | 37.9 | 1.6 | 71.9 | 10.2 |
| 6 | 47.8 | 1.6 | 73.5 | 11.8 |
| 8 | 48.5 | 1.6 | 73.7 | 12.1 |
| 10 | 47.2 | 1.6 | 73.5 | 11.9 |
| 15 | 46.4 | 1.6 | 74.0 | 12.1 |
| 20 | 45.9 | 1.6 | 75.2 | 11.7 |
| 25 | 45.5 | 1.6 | 74.3 | 11.6 |
| 30 | 45.4 | 1.6 | 75.4 | 11.5 |

EXAMPLE 3

This Example illustrates the gasification of coal using steam and CO$_2$ as the gasifying agent as opposed to steam alone as shown in Example 1.

Example 1 Runs A and B are followed except that, as gasifying agent, 1.8 gm/min of water as steam and 2.24 L/min of CO$_2$ are fed.

| RUN | TIME (min) | PRODUCTION ft$^3$/lb | H$_2$/CO MOLE RATIO | SELECTIVITY MOLE % | PRODUCTIVITY lb/hr/ft$^3$ |
|---|---|---|---|---|---|
| A | 4 | 42.4 | 0.4 | 74.6 | 14.3 |
|   | 6 | 45.3 | 0.5 | 80.2 | 13.8 |
|   | 8 | 46.6 | 0.6 | 82.2 | 13.2 |
|   | 10 | 48.4 | 0.6 | 83.0 | 13.4 |
|   | 15 | 46.5 | 0.6 | 82.5 | 13.7 |
|   | 20 | 47.8 | 0.2 | 82.5 | 14.3 |
|   | 25 | 47.3 | 0.1 | 82.6 | 14.1 |
|   | 30 | 47.0 | 0.1 | 83.8 | 14.1 |
| B | 4 | — | 0.5 | 83.1 | 14.5 |
|   | 6 | — | 0.5 | 83.4 | 14.5 |
|   | 8 | — | 0.5 | 83.0 | 14.3 |
|   | 10 | — | 0.5 | 85.4 | 14.7 |
|   | 15 | — | 0.5 | 85.2 | 15.0 |
|   | 20 | — | 0.1 | 84.6 | 15.1 |
|   | 25 | — | 0.1 | 84.6 | 15.2 |
|   | 30 | — | 0.1 | 84.9 | 15.2 |

EXAMPLE 4

This Example illustrates the gasification of coal with repeated reoxidation of iron chromite ore as the oxidant.

The reactor is charged with 1200 grams of oxidant and heated to 1050° C. 3.6 gm/min of Wyoming sub-bituminous coal entrained in 3.0 L/min of nitrogen together with 3.5 gm/min steam are fed to the reactor for 20 minutes during which time the reaction gases are sampled and analyzed. The reactor is purged with steam and nitrogen. Air is fed to the reactor for 30 minutes to reoxidize the oxidant. Coal, nitrogen and steam in the same quantities are again fed to the reactor for 30 minutes with the reaction gases sampled and analyzed. Again, the reactor was purged with steam and nitrogen and air fed for 30 minutes to again reoxidize the oxidant. Again, coal, nitrogen and steam in the same quantities are fed to the reactor with the reaction gases sampled and analyzed. The results are shown in the following Table 4.

| RUN | TIME (min) | PRODUCTION (ft³/lb) | H₂/CO MOLE RATIO | SELECTIVITY MOLE % | PRODUCTIVITY lb/hr/ft³ |
|---|---|---|---|---|---|
| 1 | 18 | 14.3 | 1.7 | 78.6 | 14.3 |
|   | 20 | 13.2 | 1.8 | 79.0 | 13.2 |
| 2 | 20 | 15.8 | 1.4 | 79.9 | 15.8 |
|   | 30 | 15.7 | 1.4 | 83.1 | 15.7 |
| 3 | 20 | 11.8 | 1.5 | 86.0 | 11.8 |
|   | 30 | 12.5 | 1.6 | 81.1 | 12.5 |

EXAMPLE 5

This Example illustrates the reduction of oxidant with a gaseous fluid in the absence of coal.

The reactor is filled with 1160 grams of iron chromite ore and maintained at 1050° C. and 5 psig. A mixture of 3.65 L/min of $H_2$ and 3.50 L/min of CO is fed to the reactor. Product gases and oxidant are sampled and analyzed at 1 minute intervals. The results are as follows:

| TIME (min) | PRODUCT GAS, MOLE % | | | | OXIDANT OXIDATION O/FE |
|---|---|---|---|---|---|
|   | CO₂ | CO | H₂ | H₂O* | |
| 0 | — | — | — | — | 1.50 |
| 1 | 48.7 | 4.0 | 0.3 | 47.1 | 1.42 |
| 2 | 45.8 | 4.3 | 1.1 | 48.9 | 1.34 |
| 3 | 41.1 | 8.1 | 2.3 | 48.6 | 1.27 |
| 4 | 26.4 | 22.5 | 9.4 | 41.8 | 1.22 |
| 5 | 14.6 | 33.6 | 25.4 | 26.5 | 1.19 |
| 6 | 12.4 | 35.3 | 30.6 | 21.7 | 1.16 |
| 7 | 11.5 | 37.9 | 33.4 | 17.2 | 1.14 |
| 8 | 6.7 | 40.9 | 38.7 | 13.7 | 1.12 |
| 9 | 4.7 | 45.1 | 42.0 | 8.4 | 1.11 |

*as steam

EXAMPLE 6

This Example illustrates the reoxidation of the reduced oxidant obtained in Example 5.

Air fed at 7.2 L/min to the reactor containing the 1160 grams of reduced iron chromite ore maintained at 1050° C. and at 5 psig. Reactor gases and oxidant are periodically sampled and analyzed. The results are as follows:

| TIME (min) | AIR, MOLE % | | OXIDANT OXIDATION O/Fe |
|---|---|---|---|
|   | O₂ | N₂ | |
| 0 | — | — | 1.20 |
| 1 | 1.4 | 98.6 | 1.22 |
| 5 | 1.5 | 98.5 | 1.34 |
| 7 | 6.5 | 93.5 | 1.39 |
| 9 | 12.4 | 87.6 | 1.41 |
| 11 | 16.1 | 83.9 | 1.43 |
| 19 | 18.4 | 81.6 | 1.46 |
| 21 | 18.8 | 81.2 | 1.46 |

EXAMPLE 7

This Example illustrates the gasification of coal using steam, $CO_2$ and steam and $CO_2$, as gasifying agents.

Example 1 Run A is followed except that, as the gasifying agent, in Run A 1.8 gm/min of water as steam and 2.24 L/min of $CO_2$ is fed, in Run B 3.6 gm/min of water as steam is fed and in Run C 4.48 L/min $CO_2$ is fed. The results of analyses of product gas periodic samples are as follows:

| RUN | TIME (min) | PRODUCTION ft³/lb | H₂/CO MOLE RATIO | SELECTIVITY MOLE % | PRODUCTIVITY lb/hr/ft³ |
|---|---|---|---|---|---|
| B | 5 | 46.3 | 1.4 | 79.9 | 12.3 |
|   | 10 | 46.6 | 1.4 | 81.0 | 12.0 |
|   | 15 | 46.9 | 1.4 | 83.1 | 12.4 |
| A | 5 | 48.4 | 0.6 | 83.0 | 13.4 |
|   | 10 | 46.5 | 0.6 | 82.5 | 13.7 |
| C | 5 | 47.8 | 0.2 | 82.5 | 14.3 |
|   | 10 | 47.3 | 0.1 | 82.6 | 14.1 |

EXAMPLE 8

This Example illustrates the advantages of this invention in pre-reduction of the oxidant in gasification product distribution.

Example 1, Run A is repeated in a 30-minute run with periodic analysis of the reaction gas composition and oxidant oxidation. The results are as follows:

| TIME (min) | OXIDANT OXIDATION O/Fe | CO₂ | CH₄ MOLE % | CO | H₂ |
|---|---|---|---|---|---|
| 0 | 1.5 | — | — | — | — |
| 2 | 1.3 | 79.2 | 1.8 | 14.2 | 4.8 |
| 4 | 1.2 | 28.9 | 2.4 | 49.5 | 20.1 |
| 6 | 1.1 | 13.1 | 1.7 | 40.2 | 45.2 |
| 8 | 1.1 | 10.1 | 1.5 | 29.4 | 59.0 |
| 10 | 1.0 | 9.3 | 1.5 | 37.4 | 51.8 |
| 20 | 0.9 | 5.8 | 1.8 | 36.4 | 56.0 |
| 30 | 0.8 | 6.3 | 2.0 | 35.5 | 56.2 |

EXAMPLE 9

This Example with reference to the drawing illustrates the continuous gasification of coal according to this invention. Iron chromite ore is circulated at the rate of 190 gm/min through the oxidizing zone 3, conduit 6, reducing zone 7, gasifying zone 9 and conduit 19. The ore-containing FeO entering oxidizing zone 3 through conduit 19 is contacted with air fed to the bottom of the oxidizing zone 3 at the rate of 11.2 L/min and 8.9 L/min of nitrogen is withdrawn from the top of oxidizing zone 3 through conduit 13. The exothermic oxidation taking place in oxidizer 3 provides 65.8 kcal/mole of FeO oxidized and heats the ore to 1150° C. and oxidizes the FeO to $Fe_2O_3$. The ore-containing $Fe_2O_3$ is removed from oxidizer 3 through conduit 6 and introduced into reducing zone 7. Synthesis gas composed of equal volumes of $H_2$ and CO is fed through conduit 8 into reducing zone 7 at the rate of 4.48 L/min. The $Fe_2O_2$ is reduced by the synthesis gas producing steam and $CO_2$. The reduction is endothermic and requires 4.6 kcal/mole of $Fe_2O_3$ reduced whereby the temperature in reducing zone 7 is 1125° C. The reduced ore and gases flow into gasifying zone 9 to which 3.4 gm/min of finely divided coal is introduced through conduit 18. The gasification of the coal with the ore and steam and $CO_2$ is endothermic and requires 36.2 kcal/mole whereby the temperature in gasifying zone 9 is 1025° C. The reduced ore-containing FeO is withdrawn from gasifying zone 9 and introduced through conduit 19 again into oxidizing zone 3. The gasifying zone 9 effluent is removed through conduit 20 at the rate of 10.3 L/min and contains 10 mole percent $CO_2$, 1 mole percent $CH_4$, 54 mole percent CO and 35 mole percent $H_2$.

As used in this Example and invention, FeO means a mixture of iron oxides having an average oxygen to iron ratio about 1.0 to 1.2 and $Fe_2O_3$ means a mixture of iron oxides having an average oxygen to iron ratio of 1.4 to 1.6.

EXAMPLE 10

This Example illustrates the continuous gasification of No. 6 Fuel Oil according to this invention.

Example 9 is repeated using 2.8 gm/min No. 6 Fuel Oil as the feed in place of the 3.4 gm/min coal. Iron chromite ore is circulated at the rate of 200 gm/min instead of 190 gm/min and the gasification reaction requires 48 kcal/mole instead of 36.2 kcal/mole. The effluent from the gasifying zone 9 is removed at the rate of 12.1 L/min instead of 10.3 L/min and contains 13 mole percent $CO_2$, 1 mole percent $CH_4$, 42 mole percent CO and 44 mole percent $H_2$.

What is claimed is:

1. A continuous process for the gasification of carbon-containing materials in a fluidization system comprising a reduction zone and a gasification zone which comprises:
   (a) introducing particulate solid oxidant at an elevated temperature into said reduction zone,
   (b) introducing a carrier gas selected from the group consisting of steam and carbon dioxide, synthesis gas and mixtures thereof substantially devoid of free oxygen into said reduction zone at such a rate to fluidize oxidant and cause it to move upwardly through said system,
   (c) maintaining said reduction zone under conditions such that when said carrier gas is synthesis gas said oxidant is at least partially reduced and said synthesis gas is oxidized to steam and carbon dioxide,
   (d) introducing carbon-containing material and steam into said gasification zone whereby said carbon-containing material is injected into and mixed with said upward moving oxidant, steam and carbon dioxide,
   (e) maintaining said gasification zone under conditions such that said carbon-containing material, steam and carbon dioxide are endothermically reacted to a mixture of carbon monoxide and hydrogen, and
   (f) withdrawing a gaseous effluent comprising carbon monoxide and hydrogen from said gasification zone.

2. The process of claim 1 wherein said carbon-containing material is coal.

3. The process of claim 2 wherein said coal is a coal of rank ranging from lignite through anthracite.

4. The process of claim 1 wherein said carbon-containing material is peat.

5. The process of claim 1 wherein said carbon-containing material is coke.

6. The process of claim 1 wherein said carbon-containing material is oil.

7. The process of claim 6 wherein said oil is fuel oil.

8. The process of claim 1 wherein said oxidant is a natural or synthetic metal oxide containing material.

9. The process of claim 8 wherein said material is iron chromite ore.

10. The process of claim 8 wherein said material contains iron oxide.

11. The process of claim 8 wherein said material contains copper oxide.

12. The process of claim 8 wherein said material contains cobalt oxide.

13. The process of claim 8 wherein said material contains cerium oxide.

14. The process of claim 8 wherein said material contains manganese oxide.

15. The process of claim 1 wherein the temperatures maintained in said reduction and gasification zones are from 800° C. to 1200° C.

16. The process of claim 1 wherein the superficial gas velocity in the reduction and gasification zones is above 10 feet per second.

17. A continuous process for the gasification of carbon-containing materials in a fluidization system comprising a reduction zone and a gasification zone and an associated oxidation zone which comprises:
   (a) introducing particulate solid oxidant at an elevated temperature into said reduction zone,
   (b) introducing a carrier gas selected from the group consisting of steam and carbon dioxide, synthesis gas and mixtures thereof substantially devoid of free oxygen into said reduction zone at such a rate to fluidize said oxidant and cause it to move upwardly through said system,
   (c) maintaining said reduction zone under conditions such that when said carrier gas is synthesis gas said oxidant is at least partially reduced and said synthesis gas is oxidized to steam and carbon dioxide,
   (d) introducing carbon-containing material and steam into said gasification zone whereby said carbon-containing material is injected into and mixed with said upward moving oxidant, steam and carbon dioxide,
   (e) maintaining said gasification zone under conditions such that said carbon-containing material, steam and carbon dioxide are endothermically reacted to a mixture of carbon monoxide and hydrogen,
   (f) withdrawing a gaseous effluent comprising carbon monoxide and hydrogen from said gasification zone,
   (g) withdrawing from said gasification zone and introducing into said oxidation zone said reduced oxidant,
   (h) introducing an oxidizing gas into said oxidation zone,
   (i) maintaining said oxidation zone under exothermic conditions such that said oxidant is reoxidized to an oxidized state and reheated to an elevated temperature sufficient to effect oxidation of said carrier gas and gasification of said carbon-containing material, and
   (j) withdrawing from said oxidation zone and introducing into said reduction zone said reoxidized heated oxidant.

18. The process of claim 17 wherein the gas velocities maintained in said reduction and gasification zones is about 10 feet per second.

19. The process of claim 19 wherein
   (a) said oxidant is a synthetic or natural occurring metal oxide-containing material,
   (b) said reduction zone is maintained at 800° C. to 1200° C.,
   (c) said carbonaceous material is coal of rank from lignite through anthracite,
   (d) said oxidation zone is maintained at 800° C. to 1200° C., and
   (e) said oxidizing gas is air.

20. The process of claim 19 wherein said material is iron oxide containing.

21. The process of claim 20 wherein said material is iron chromite ore.

* * * * *